United States Patent [19]

Stahlhuth

[11] 4,446,750

[45] May 8, 1984

[54] ESCAPEMENT DEVICE

[75] Inventor: Paul H. Stahlhuth, Mission Viejo, Calif.

[73] Assignee: Ford Aerospace & Communications Corporation, Detroit, Mich.

[21] Appl. No.: 331,110

[22] Filed: Dec. 16, 1981

[51] Int. Cl.[3] .................... F16H 27/04; G04B 15/00

[52] U.S. Cl. .................... 74/1.5; 185/38; 368/124

[58] Field of Search .................... 74/1.5; 185/5, 31, 38; 368/124

[56] References Cited

U.S. PATENT DOCUMENTS

| | | | |
|---|---|---|---|
| 1,973,106 | 9/1934 | Rosenberger | 185/38 |
| 2,722,299 | 11/1955 | Otis et al. | 192/26 |
| 2,855,768 | 10/1958 | Plano | 64/28 |
| 2,871,702 | 2/1959 | Tetro | 74/1.5 |
| 2,871,712 | 2/1959 | Drury | 74/111 |
| 2,907,167 | 10/1959 | Olsen | 58/116 |
| 3,005,355 | 10/1961 | Mason | 74/112 |
| 3,063,297 | 11/1962 | Hyde | 74/56 |
| 3,316,769 | 5/1967 | Nordin | 74/1.5 |
| 3,640,142 | 2/1972 | Stafford et al. | 74/112 |

*Primary Examiner*—Allan D. Herrmann
*Attorney, Agent, or Firm*—Steven L. Permut; Edward J. Radlo; Robert D. Sanborn

[57] ABSTRACT

An escapement device has a latch plate interposed between an input and output shaft. The latch plate is pivotably connected to the input and output shafts. The latch plate has a shoulder which abuts a coaxially mounted gear ring. The output shaft is spring loaded to rotate in one direction. The input shaft can be rotated to disengage the shoulder of the latch from one of the gear ring teeth to allow the output shaft to rotate under its spring bias until the output shaft repositions the latch shoulder to reengage another one of the gear ring teeth.

8 Claims, 3 Drawing Figures

ESCAPEMENT DEVICE

BACKGROUND OF THE INVENTION

1. Field of the Invention

This invention relates generally to escapements, and more particularly, to an escapement which allows incremental amounts of motion of an output shaft at a high torque.

2. Disclosure Information

Escapement devices often use an oscillating member. The oscillating member has a pair of prongs that alternately engage teeth of a rotatable sprocket. The sprocket is rigidly connected to an output member. The output member is often spring biased to rotate such that when the oscillating member swings and disengages its one prong from a tooth of the sprocket, the sprocket immediately rotates until another tooth thereof engages the other prong. Such oscillating devices can be seen in U.S. Pat. No. 3,316,769 issued to Nordin on May 2, 1967; U.S. Pat. No. 2,907,067 issued to Olsen on Oct. 6, 1959 and U.S. Pat. No. 3,063,297 issued to Hyde on Nov. 13, 1962.

Other escapement devices have been devised to to eliminate the oscillating pendulum motion. One device is disclosed in U.S. Pat. No. 2,871,702 issued to Tetro on Feb. 3, 1959 which has an output member and an input member both connected to a spring which is preloaded. The input member has a cam which engages an intermediate sliding block which is forced to disengage from varius stops mounted on the escapement housing after a predetermined amount of rotation of the input member. The output member is then free to rotate with the sliding block until the sliding plate reengages a succeeding stop. The input member is again rotated to rewind the spring and disengage the sliding block from the stop.

Another sliding block escapement device is disclosed in U.S. Pat. No. 3,640,142 issued to Stafford on Feb. 8, 1972. The Stafford patent discloses an input member which is connected to the spring that drives the output member.

SUMMARY OF THE DISCLOSURE

According to the present invention, an escapement device has a rotatable input member and a spring loaded rotatable output member. The input and output members are both connected to an intermediate brake member which engages a stationary internally toothed ring that is coaxially mounted thereabout. The brake member is constructed to be disengaged from the stationary ring in response to a predetermined amount of rotation of the input member whereby the output member is free to rotate in response to the spring force by an amount equal to the angular displacement of the input shaft.

Preferably, the brake member is pivotably connected to the input member and has a second pivotable connection to the output member offset from the axis of rotation of the connection to the input member.

The broader aspects of the invention include an output shaft and an input shaft that are rotatable with respect to each other. The output shaft is urged to rotate in a first direction. A brake member engages the output shaft and has a first condition which prevents rotation of the output shaft and a second condition which allows angular displacement of the output shaft. The brake member is constructed to move from its first condition to its second condition in response to the predetermined angular displacement of the input shaft. The output shaft is biased such that its output torque is greater than the input torque required to be exerted by the input shaft onto the brake member.

BRIEF DESCRIPTION OF THE DRAWINGS

Reference now will be made to the accompanying drawings in which.

DETAILED DESCRIPTION OF THE PREFERRED EMBODIMENT

Figure 1:
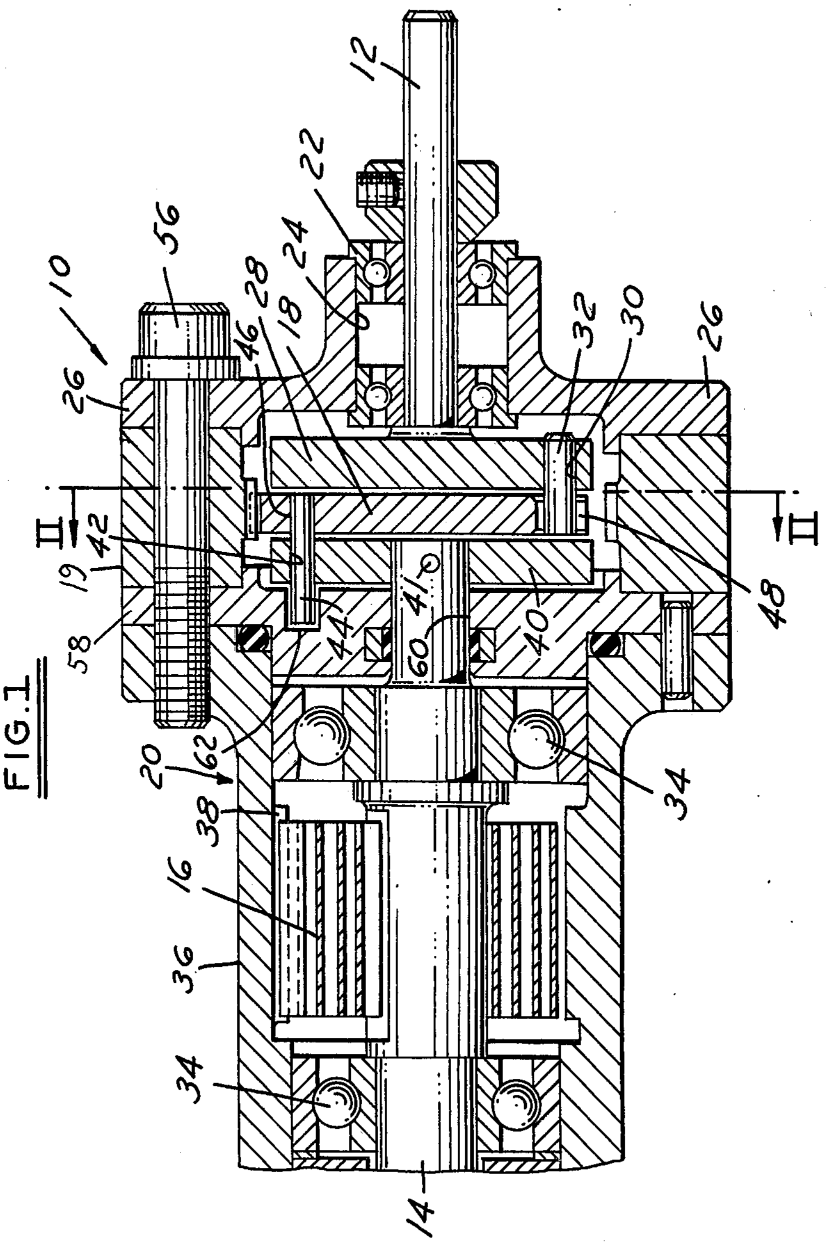
FIG. 1 is a side elevational and partially segmented view of one embodiment of the invention.

Referring particularly to FIG. 1, an escapement device generally indicated as 10 has an input shaft 12, an output shaft 14 biased to rotate in one direction by spring 16, a latch plate 18 positioned between the input shaft 12 and output shaft 14, and an internally toothed ring 54 secured to a housing 20 that houses the previously mentioned parts.

The input shaft 12 is rotatably mounted by bearings 22 interposed between the shaft 12 and end cap 26. The shaft 12 is integral with an enlarged disc 28. The disc 28 has an aperture 30 near its outer periphery that receives a pin 32.

Similarly, the output shaft 14 is mounted by bearings 34 within the body portion 36 of housing 20. Torsion spring 16 has one end anchored to flange 38 and housing body 36 and another end secured to the shaft 14. The spring 16 is preloaded to rotate the shaft 14 in one direction (counter-clockwise in FIGS. 2 and 3). The shaft 14 has its inner end fixedly secured to a disc 40 by pin 41. The disc 40 has an aperture 42 therethrough near its periphery which receives a pin 44.

Figure 2:
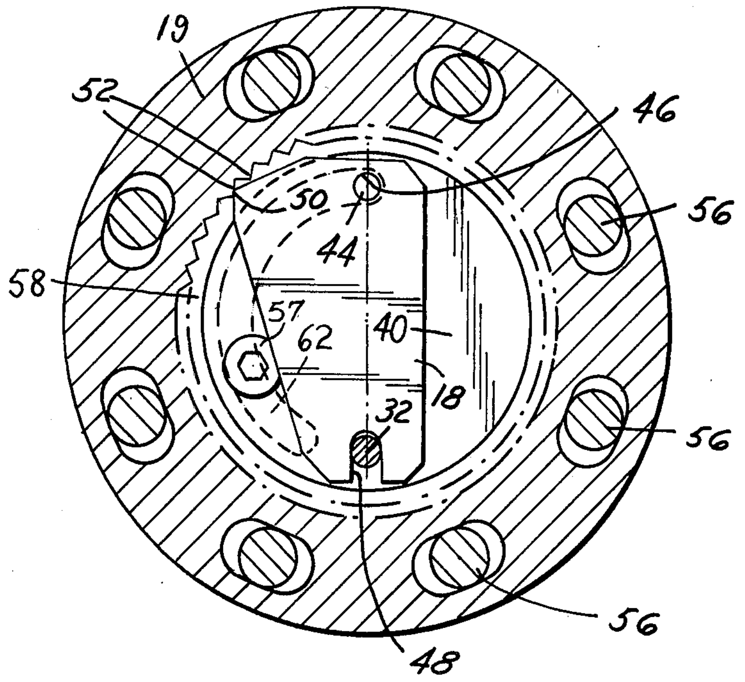
FIG. 2 is a cross-sectional view taken along the lines II—II shown in FIG. 1 showing the latch member engaging the stop ring.
Figure 3:
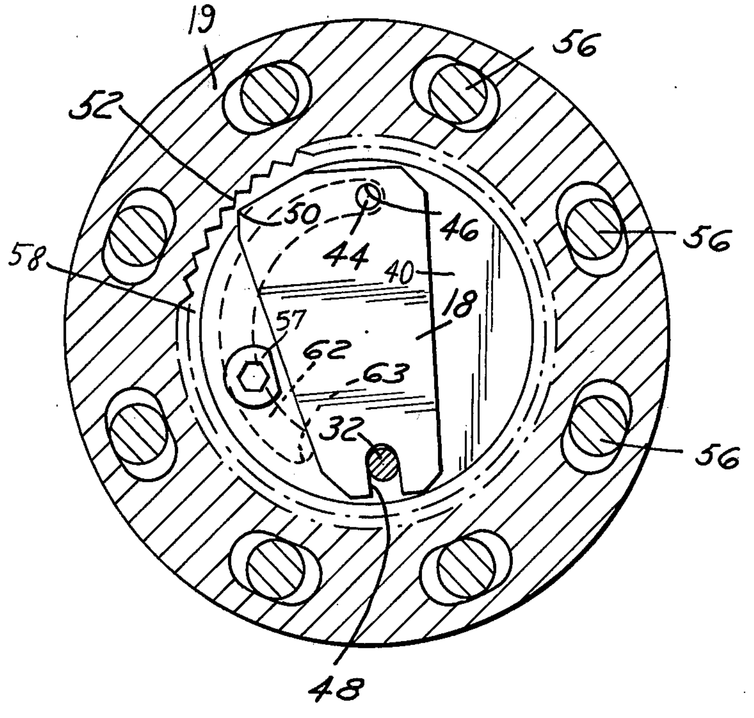
FIG. 3 is a view similar to FIG. 2 showing the latch member disengaged from the stop ring.

As shown clearly in FIGS. 2 and 3, the pin 32 and pin 44 are positioned approximately 180° from each other with respect to the axes of the two shafts 12 and 14. Pin 44 extends through an aperture 46 in latch plate 18. Pin 32 extends through a notch 48 at the edge of latch plate 18. Latch plate 18 has a shoulder 50 at its forward edge. The shoulder 50 is substantially transverse to a line which passes from the shoulder to the center of pin 44. The shoulder 50 normally abuts one of a plurality of teeth 52 of the internally toothed ring 54 as shown in FIG. 2. The ring 54 is bolted, as shown in FIG. 1, between the end cap 26 and body 36 of housing 20 by a plurality of bolts 56.

A plate 58 is also secured to the housing by bolts 56. The plate has a central aperture 60 which receives the inner end of shaft 14. The plate also has an arcuate groove 62 which slideably receives pin 44.

In operation, shaft 14 is normally held stationary via the rigid connection to the disc 40 which, in turn, is held in place by pin 44 extending from the latch 18. The latch 18 is prevented from rotating by having its shoulder 50 normally abutting one of the teeth 52 of ring 54 as shown in FIG. 2.

Input shaft 12 is free to rotate a desired amount in the counter-clockwise direction as viewed in FIGS. 2 and 3. As the shaft 12 rotates, pin 32 revolves about the axis of rotation. The latch 18, engaging the pin 32 via notch 48, is forced to pivot; but, its pivotal axis is not coincident with the axis of rotation of shaft 12. Instead, the latch 18 pivots about pin 44. As the latch pivots about pin 44, the shoulder 50 is moved radially inwardly toward the axis of shaft 12 until shoulder 50 disengages from the toothed ring 19 as shown in FIG. 3.

When the disengagement occurs, the spring loaded output shaft 14 is free to rotate counter clockwise under the influence of preloaded spring 16. The spring 16 is preloaded to bias the output shaft in the counter-clockwise direction as viewed in FIGS. 2 and 3.

As the output shaft 14 rotates under the spring bias, the pin 44 thereby moves within arcuate groove 62. As the pin 44 moves within the groove 62, it forces the latch plate 18 to pivot about pin 32 until the shoulder 50 reengages another one of the teeth 52. As the shoulder 50 reengages one of the teeth 52, further rotation of output shaft 14 is prevented. The escapement device is thereby ready to repeat the above described operation.

The input torque needed to rotate shaft 12 does not have to overcome the spring 16 since rotation of the input shaft 12 does not wind up spring 16. Input (unlatching) torque is only required to be large enough to overcome the friction between shoulder 50 and the teeth 52 of toothed ring 54. Spring 16 is anchored only to the output shaft and the housing. Consequently, the output torque provided by output shaft 14 can be significantly higher than the input torque exerted on input shaft 12.

The output shaft is released for incremental amounts of rotation based upon the amount of rotation of input shaft 12 and the spacing of teeth 52. A rotation of input shaft 12 less than the amount needed to disengage the shoulder 50 from one of the teeth 52 produces no motion of output shaft 14. Once the shoulder 50 is disengaged from one of the teeth 52, the output shaft rotates a predetermined minimum amount so that the shoulder engages a successive tooth of ring 54. No smaller amount of rotation is possible for output shaft 16. On the other hand, multiple amounts of the predetermined minimum amount of rotation are possible if the input shaft rotates more than the minimum amount.

The total angular displacement of output shaft 16 is controlled by the angular span of the arcuate groove 62. The arcuate groove 62 can be a total circle or an arc spanning any predetermined number of degrees less than 360° whereby the output shaft 14 is allowed to rotate only those predetermined number of degrees before the pin 44 abuts the end 63 of groove 62.

In this fashion, an incremental escapement device uses a rotational input shaft rather than an oscillating input device and allows the output shaft to rotate with a high torque compared to the input torque of the input shaft. In addition, the incremental amount of angular rotation is easily predetermined by the spacings of teeth 52. The total amount of rotation is easily determined by the angular span of acruate groove 62. Bolt head 57 (see FIGS. 2 and 3) is the head of a bolt which has been fixedly inserted into disc 40 and slightly protrudes therefrom. One side of bolt head 57 is flat, coinciding with and acting as a stop for one edge of latch plate 18 when the latter is in the engaged position (FIG. 2). This prevents shoulder 50 from engaging too tightly into teeth 52, reducing the wear and tear thereon.

Variations and modifications of the present invention are possible without departing from its spirit and scope as defined by the appended claims.

The embodiments in which an exclusive property or privilege is claimed are defined as follows:

1. An escapement device comprising:

a rotatable input member;

a rotatable output member;

means for urging said output member to rotate in one direction;

a pivotable intermediate member having a first pivotable connection to said input member offset from the axes of rotation of said input and output members and a second pivotable connection to said output member offset from the axis of rotation of said first pivotable connection and the axes of rotation of said input and output members;

a stop means engageable by said intermediate member when said intermediate member is in a first relative position with said input and output members for stopping said output member from rotation urged by said urging means; and said intermediate member pivotable to a second relative position with respect to said input and output members upon rotation of said input member a predetermined amount such that said intermediate member disengages from said stop means to allow said output member to rotate in said one direction and said intermediate member pivots back to its first relative position upon rotation of said output member a predetermined amount to reengage said stop means.

2. An escapement device characterized by:

an input shaft rotatably mounted about its longitudinal axis;

an output shaft rotatably mounted about its longitudinal axis;

biasing means for biasing said output shaft to rotate in one direction;

stop means circumferentially mounted in a plane substantially perpendicular to the axis of rotation of said input shaft for stopping rotation of said output shaft;

an abutting means for abutting said stop means;

said input shaft having a first engaging means radially spaced from the axis of rotation of said input shaft for engaging said abutting means;

said output shaft having a second engaging means pivotably connected to said abutting means at a point spaced from said first engaging means of said input shaft and said axis of rotation of said input shaft;

said two engaging means constructed to cooperate such that when said second engaging means is in a first relative position with respect to said first engaging means about the axis of rotation of said input shaft, said abutting means is positioned to abut said stop means and to prevent said output shaft from rotating in the direction of its bias, and upon rotation of said input shaft a predetermined amount said first engaging means rotates said abutting means about said second engaging means to disengage said abutting means from said stop means to allow said output shaft to rotate in the direction of its bias a predetermined amount until said second engaging means returns to said first relative position to cause said abutting means to abut said stop means;

wherein said axis of rotation of said input shaft is aligned with the axis of rotation of said output shaft;

said first engaging means of said input shaft comprises a protrusion operably connecting said input shaft to said abutting means; and said second engaging means of said output shaft comprises a second protrusion operably connecting said output shaft to said abutting means such that said abutting means pivots about the longitudinal axis of said second protrusion to disengage from said stop means;

wherein: said first protrusion is received in an elongated aperture which extends radially outward with respect to the axis of rotation of said aligned shafts.

3. An escapement device as defined in claim 2 wherein:

said second protrusion is circumferentially spaced from said first protrusion such that said relative first position of said second protrusion with said first protrusion about said axis of rotation is approximately 180° displaced from said first protrusion with respect to said axis of rotation of said shafts.

4. An escapement device as defined in claim 2 wherein:

said abutting means has a shoulder which extends radially outward with respect to the axis of rotation of said shafts;

said stop means include radially inwardly extending teeth on a gear ring coaxially mounted with respect to said shafts with said teeth engageable with said shoulder.

5. An escapement device as defined in claim 4 wherein:

said shoulder of said abutting means has its surface sloped to be approximately perpendicular to a line extending from said shoulder to said second protrusion.

6. An escapement device characterized by:

a housing member with a cavity therein and two openings extending from opposite sides of said cavity;

an input shaft rotatably mounted to said housing member through one of said openings and having one of its ends within said cavity;

an output shaft rotatably mounted to said housing member through said other opening and having its axis of rotation aligned with the axis of rotation of said input shaft;

said output shaft having one of its ends within said cavity opposing and axially spaced from said end of said input shaft;

a spring biasing said output shaft to rotate in one direction;

a ring gear fixed to said housing and coaxially mounted with respect to said shafts and axially positioned between said spaced opposing ends of said first and second shafts;

said ring gear having inwardly extending teeth;

a latch plate extending in a generally perpendicular attitude with respect to the axis of rotation of said shafts and interposed between said spaced opposing ends of said shafts and axially aligned with said ring gear;

said latch plate having a shoulder abuttable to one of said teeth of said fixed ring gear, a radially extending slot spaced from the axis of rotation of said a pin extending through said radially extending slot and connected to said input shaft such that said input shaft drivingly engages said latch;

a second pin extending through said aperture in said latch plate and connected to said output shaft such that rotation of said output shaft is stopped by engagement with said latch plate which abuts one of said teeth of said fixed ring gear;

rotation of said input member a predetermined amount pivots said latch plate about said second pin such that said latch shoulder disengages from said one of said teeth of said ring gear to allow said output shaft to rotate a predetermined amount wherein said latch plate shoulder abuts another one of said teeth of said fixed ring gear.

7. An actuating device having an angularly displaceable output shaft and an angularly displaceable input shaft said actuating device comprising:

biasing means urging said output shaft to be angularly displaced in a first direction;

brake means engaging said output shaft and having a first condition in which angular displacement of said output shaft in said first direction is prevented and a second condition in which angular displacement of said output shaft is not prevented;

said brake means being constructed to be displaced from said first condition to said second condition in response to angular displacement of said input shaft whereby said output shaft is free to be angularly displaced in response to the force exerted by said biasing means by an amount equal to the angular displacement of said input shaft;

said biasing means being constructed to cause said output shaft to deliver an output torque that is greater than the input torque required to be exerted on said input shaft to displace said brake means from its first condition to its second condition.

8. An actuating device having an angularly displaceable output shaft and an angularly displaceable input shaft coaxially arranged with respect to said output shaft, said device being constructed to deliver an output torque that exceeds its input torque and comprises:

biasing means urging said output shaft to rotate in a first direction;

braking means comprising a stationary member and a movable braking element constructed to prevent the displacement of said output shaft in said first direction when said braking element is in a first position with respect to said input and output shafts (in engagement with said stationary member at a first location thereof) and constructed to permit the displacement of said output shaft in said first direction when said braking element is in a second position with respect to said input and output shafts (spaced apart from said stationary member);

said braking element being constructed to be displaced from said first position to said second position in response to angular displacement of said input shaft whereby said output shaft is free to rotate in response to the force exerted by said biasing means and said braking element being constructed to move from said second position back to said first position (in engagement with said stationary member at a second location thereof) in response to the angular displacement of said output shaft by an amount substantially equal to the angular displacement of said input shaft;

said biasing means being constructed to cause said output shaft to deliver an output torque that is greater than the input torque required to be exerted on said input shaft to displace said brake element from its said first position to its said second position.

* * * * *

UNITED STATES PATENT AND TRADEMARK OFFICE

CERTIFICATE OF CORRECTION

PATENT NO. : 4,446,750

DATED : May 8, 1984

INVENTOR(S) : Paul H. Stahlhuth

It is certified that error appears in the above-identified patent and that said Letters Patent are hereby corrected as shown below:

In Col. 5, line 62, after the word "said" insert --shafts, and an aperture circumferentially spaced from said slot with respect to the axis of rotation of said shafts;--.

Signed and Sealed this

*Twenty-fifth* Day of *September 1984*

[SEAL]

*Attest:*

GERALD J. MOSSINGHOFF

*Attesting Officer* *Commissioner of Patents and Trademarks*